United States Patent [19]

Kraus et al.

[11] 4,221,115
[45] Sep. 9, 1980

[54] ALTITUDE GAS PRESSURE DIFFERENTIAL POWER PLANT

[76] Inventors: Robert A. Kraus; Edmund J. Kraus, both of 14160 Redhill #39, Tustin, Calif. 92680

[21] Appl. No.: 871,246

[22] Filed: Jan. 23, 1978

Related U.S. Application Data

[63] Continuation-in-part of Ser. No. 763,498, Jan. 28, 1977, abandoned.

[51] Int. Cl.² .............................................. F02C 1/02
[52] U.S. Cl. .......................................... 60/398; 60/650
[58] Field of Search ................... 60/398, 641, 650, 682, 60/721

[56] References Cited

U.S. PATENT DOCUMENTS

| | | | |
|---|---|---|---|
| 3,436,908 | 4/1969 | Van Delic | 60/641 |
| 3,945,218 | 3/1976 | Parker | 60/641 X |
| 4,033,126 | 7/1977 | Newland | 60/641 X |

Primary Examiner—Allen M. Ostrager

[57] ABSTRACT

A device, operating on a closed gas power cycle between an upper and a lower horizontal datum plane, being separated through a distance of enormous height; comprising the steady-flow compression and the cooling of a suitable gas at the upper datum plane, and its reheating, and power-producing expansion through a compressor matched turbine at the lower datum plane; gravitational downward attractive force which is acting on the steady within a conduit downward-flowing mass of compressed gas, produces increased weight, which, in turn, produces a gravity-generated, from the compressor discharge to the turbine inlet, a downwardly increasing gas pressure rise; the gravity-produced gas pressure rise produces in the compressed gas expansion at the lower datum plane a substantially greater amount of power than is consumed in the gas compression at the upper datum plane, thus resulting in a surplus generated power output.

13 Claims, 3 Drawing Figures

ALTITUDE GAS PRESSURE DIFFERENTIAL POWER PLANT

This application is a continuation in part of our earlier application, filed at the United States Patent Office on Jan. 28, 1977, with the title GRAVITY INDUCED AIR COMPRESSION POWER PLANT, having the Ser. No. 763,498, which is now abandoned.

This invention will find its use in the unlimited, dependable and environmentally safe production of cheap electric power.

Accordingly, it is an object of the invention to provide the means for the continuous utilization of gravity as a prime source of energy in the production of power through the employment of the altitude gas pressure difference intensification principle which enables a suitable, compressed gas, under steady-flow condition, to be recompressed to substantially higher pressure without the expenditure of shaft work, thus producing in its expansion to final pressure a greater amount of work than is consumed in its compression from initial to compressor discharge pressure, thereby producing a substantial net power output.

DESCRIPTION OF THE DRAWINGS

Figure 1:
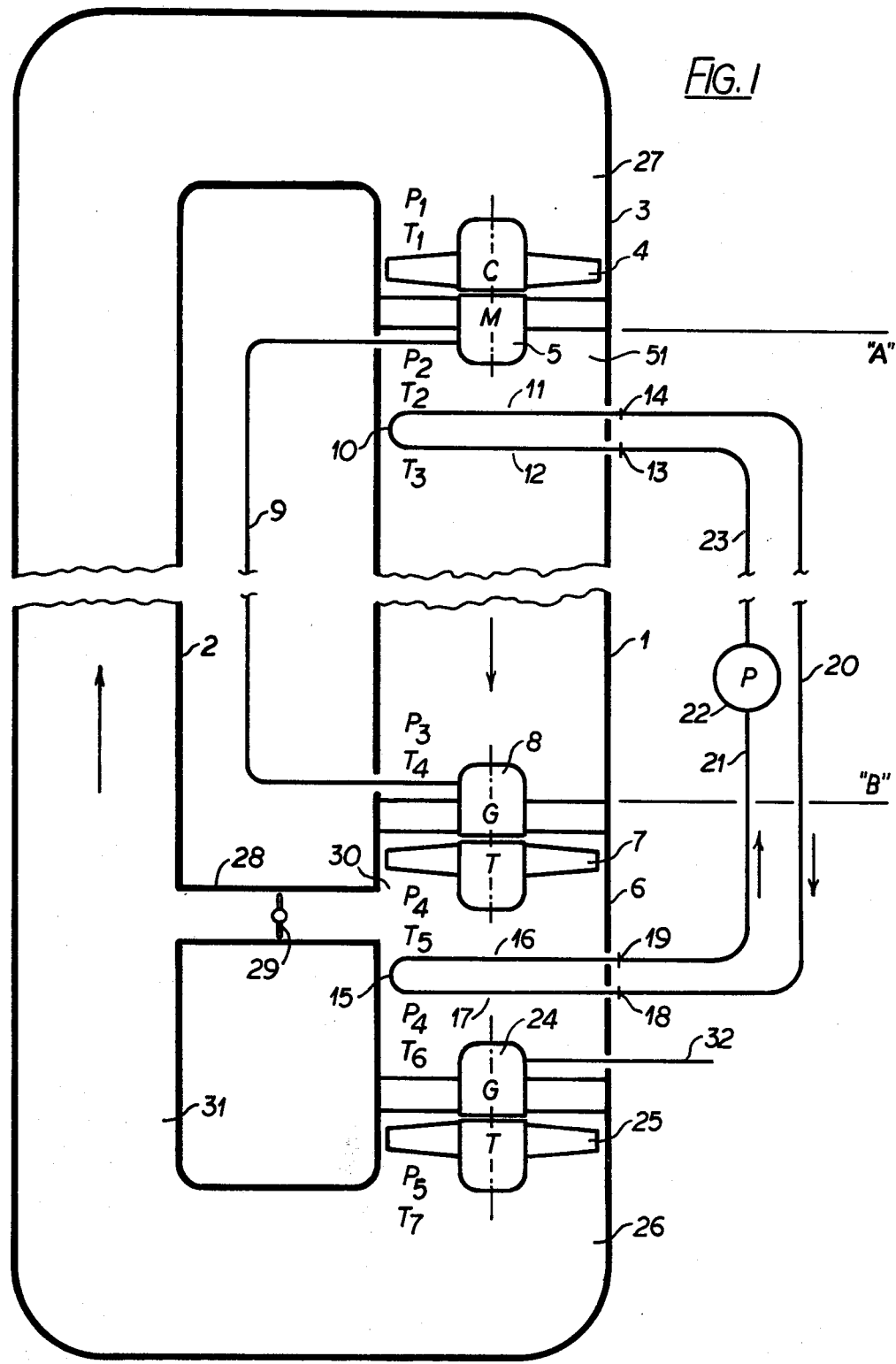
FIG. 1 is a schematic representation of the invention incorporating after cooling and compression heat recuperating features.

FIG. 1 shows the schematic representation of the composite arrangement of the gravity-utilizing power plant in its preferred embodiment, incorporating after cooling and compression heat recuperating features. Wherein, the closed gas recirculation system comprises the vertically oriented, conduit 1 and the vertically oriented gas return duct 2.

The conduit 1 extends from the lower horizontal datum plane "B" to the upper horizontal datum plane "A", through a distance of enormous height, which may be several thousand feet. For this reason, the major portion of conduit 1, and the gas return duct 2 are not shown in the drawing. It must be clear, however, that the portion of conduit 1 not shown in the drawing represents one of the system's most essential components.

The conduit 1 comprises within its upper end 3 the gas compressor 4, which is driven by the electric motor 5, as well as comprises within its lower end 6 the primary high pressure turbine 7, driving the primary electric generator 8. The primary electric generator 8 is electrically coupled via the power transmission 9 to the electric motor 5 in such a way that the turbine 7 drives the thereto matched gas compressor 4.

The conduit 1 further comprises within its upper end 3, downstream of the compressor 4, the compression heat-removing aftercooler heat exchanger 10 having the hot gas inlet 11, the cooled gas outlet 12, the cooled heat-transfer fluid inlet 13 and the heated heat-transfer fluid outlet 14, as well as comprising within its lower end 6, downstream of the primary turbine 7, the compression heat recuperating heat exchanger 15, having the primary turbine expansion cooled gas inlet 16, the heated gas outlet 17, the heated heat-transfer fluid inlet 18 and the cooled heat-transfer fluid outlet 19.

The heated heat-transfer fluid outlet 14 of the heat exchanger 10 is fluid communicatively connected via piping 20 to the heated heat-transfer fluid inlet 18 of the heat exchanger 15 and the cooled heat-transfer fluid outlet 19 of the heat exchanger 15 is fluid communicatively connected via piping 21, the fluid pump 22 and the piping 23 to the cooled heat-transfer fluid inlet 13 of the heat exchanger 10, thus forming a closed fluid recirculating system which is filled with a suitable heat-transfer fluid being circulated from the heat exchanger 10 downward to the heat exchanger 15 and again upward to the heat exchanger 10.

The lower end 6 of conduit 1 further comprises the secondary electric generator 24, which is driven by the secondary low-pressure turbine 25. The secondary turbine outlet 26 is fluid communicatively connected to the compressor inlet 27 by the gas return duct 2, to form a closed gas recirculating system, containing a suitable gas at pre-determined pressure.

The gas bypass duct 28, incorporating the waste gate control valve 29, fluid communicatively connects the conduit 30 between the primary turbine 7 and the secondary turbine 25 to the lower portion 31 of the gas return duct 2. 32 represents the electric power transmission from the secondary generator 24 for the distribution of the surplus generated power output.

Figure 2:
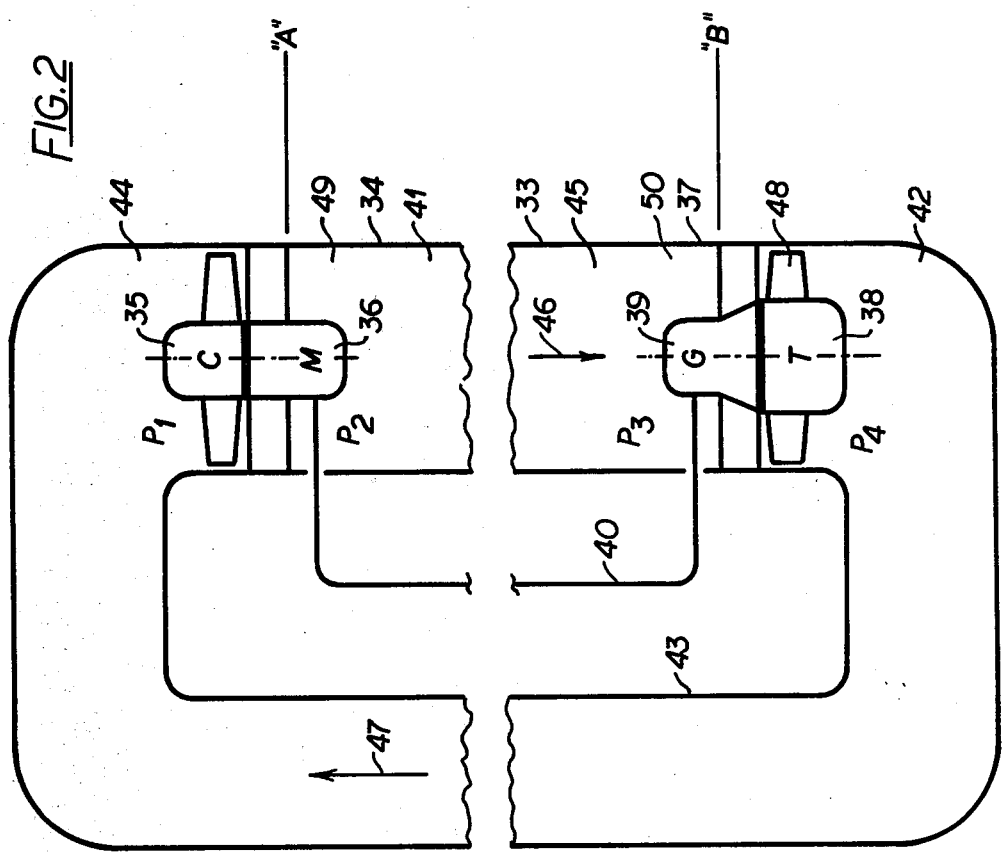
FIG. 2 is a schematic representation of an alternative embodiment of the invention which is similar to FIG. 1 but excludes the after cooling and compression heat recuperating features.

FIG. 2 shows the schematic diagram of the composite arrangement of the gravity-utilizing power plant in its simplest configuration, excluding aftercooler and compression heat recuperating features, comprising the vertically oriented fluid conduit 33 having a height extending from the lower horizontal datum plane "B" to the upper horizontal datum plane "A".

The fluid conduit 33 comprises within its upper end 34, the gas compressor 35 which is driven by the electric motor 36, as well as comprises within its lower end 37, the turbine 38, which drives the electric generator 39. The electric generator 39 is electrically coupled via the power transmission 40 to the electric motor 36 in such a way that turbine 38 drives the thereto matched gas compressor 35.

Thus, the gas conduit 33 is closed at its upper end by the compressor 35 and at its lower end by the turbine 38 to form the gravitational gas compression means 41 of enormous height, the major portion of which is not shown in the drawing.

The expanded gas outlet 42 of turbine 38 is fluid communicatively connected by the gas return duct 43 to the gas inlet 44 of the compressor 35 so as to form the closed gas recirculation system, which is pressurized with a suitable gas 45 to predetermined pressure.

Accordingly, in FIG. 2, as long as the system is at rest the contained gas is subject to gravitational downward attractive force which is acting on its mass, thus causing a downwardly increasing gas pressure rise, the magnitude of which is the function of the specific gravity of the employed gas, the extent of height between the compressor discharge and the turbine inlet ports, and the extent of gas pressure at the system's upper end.

Since the conduit 33 and the return duct 43 are fluid communicatively connected at their upper and lower ends, the gas pressure within conduit 33 and the gas pressure within gas return duct 43 is equal, thus the system is in a state of equilibrium.

Therefore, consistent with the law of communicating vessels, the slightest gas pressure rise across the compressor 35 will set the entire mass of gas in motion in direction of arrows 46 and 47 regardless of the altitude pressure difference existing within the system.

To start the system's operation, it is necessary for a temporary external power source to be connected to the compressor driving motor 36. As the motor-coupled compressor 35 begins to gain rotative speed, some of the gas within the gas return duct 43 is compressed by the compressor 35 into the upper end 34 of the vertically oriented conduit 33. The gas flow restriction through the plating 48 of the compressor matched turbine 38, within the conduit lower end 37, is backing up the steady downward-flowing gas, which continuously maintains the substantially elevated pressure of the gas within the conduit 33, while the pressure within the gas return duct 43 is sufficiently reduced to enable turbine 38 to produce work.

The major portion of compressor 35 consumed work is stored in the steady within the conduit 33 downward-flowing mass of compressed gas as an energy in form of its elevated pressure $P_2$; which stored energy is partially reconverted into work through the compressed gas expansion within turbine 38 to the substantially lower pressure $P_4$ within the lower end of the gas return duct 43.

As the combined turbine-compressor drive system approaches operational rotative speed and as the gas within conduit 33 approaches operating pressure, the temporary external power source is disconnected from the compressor-driving motor 36.

At this point, the turbine compressor drive system by itself would be of no avail in the production of power since the system is subject to frictional and other inherent limitations which render the system less than 100% efficient. Thus, the system requires an input of power just to continue running.

However, at the attainment of the system's operational rotative speed, the gas compressor-produced discharge pressure $P_2$ is sufficiently modified within the conduit 33 through the addition of a needed amount of energy prior to its expansion so that the compressed gas is capable, in its expansion within turbine 38, of producing a substantially greater amount of work than is consumed by the compressor 35 in the compression of the gas to compressor discharge pressure. Thus, at this point, the system attains its self-sufficient mode of operation and produces a substantial amount of surplus generated power.

The needed form of energy necessary to sustain the operation of the turbine compressor drive system and its necessary accessories, as well as to produce a substantial surplus of generated power output, represents itself as an essential non-power-consuming side product as a function of the vertically confined within the conduit 33 steady downward-flowing column mass of compressed gas 45.

Wherein, the essential side product is the substantial increase in the gas density as a function of its volumetric reduction.

The downward-flowing mass of compressed gas 45 within conduit 33 is under the influence of the earth's gravitational downward attractive force which is acting on it, thus, the gravitational downward attractive force in conjunction with the compressed gas' highly increased density produces and continuously maintains a substantial increase in the gas' weight within conduit 31.

The gas' increased weight, in turn, manifests itself, in addition to the compressor-produced discharge pressure $P_2$, as a non-power-consuming, from the compressor discharge pressure to the substantially higher turbine inlet pressure $P_3$ within the conduit 33, downwardly increasing gas pressure rise $P_3 - P_2$. The magnitude of the gas pressure rise is the function of the employed gas' specific gravity, the extent of the system's pressurization, the extent of the conduit height between the compressor discharge 49 and the turbine inlet 50, and the ratio of the gas compression from the compressor inlet pressure $P_1$ to the compressor discharge pressure $P_2$.

Wherein, as a function of the gravitational interaction with the vertically confined, steady downward flowing mass of compressed gas at highly increased density, the expansion of the compressed gas from the turbine inlet pressure $P_3$ to the turbine exhaust pressure $P_4$, produces a substantially greater amount of power than is necessary in the gas compression from the compressor inlet pressure $P_1$ to the compressor discharge pressure $P_2$; a portion of the total power produced by turbine 38 is utilized in the driving of the compressor 35 and to operate the system's accessories, and the remainder is the net generated power output.

Figure 3:
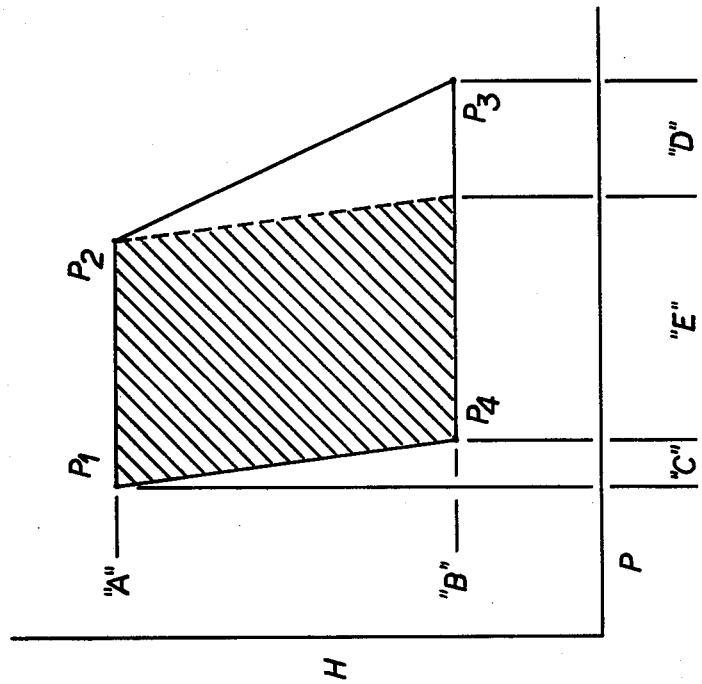
FIG. 3 shows a height versus pressure diagram illustrating the successively occurring processes of the steady flow gas power cycle of a system as in FIG. 2 in the numerical order from 1 to 4.

FIG. 3 shows the successive occurring processes of the system in FIG. 2, illustrating the gas power cycle's height versus pressure (H-P) diagram, excluding aftercooling and compression heat-recuperating features.

Wherein, the line between $P_1$ and $P_2$ represents the gas' mechanically produced compression process $P_2 - P_1$, and the line between $P_3$ and $P_4$ represents the gas' power-producing expansion process $P_3 - P_4$.

"C" represents the gravity-produced altitude pressure difference $P_4 - P_1$ between the datum planes "A" and "B", which are separated by a distance of enormous height. The magnitude of which altitude pressure difference is the function of the employed gas' specific gravity, the extent of the system's height, and the extent of the system's pressurization.

"D" represents the non-power-consuming by gravity-produced, from the compressor discharge pressure $P_2$ to the substantially higher turbine inlet pressure $P_3$, downwardly increasing pressure rise $P_3 - P_2$; the magnitude of which is the function of the specific gravity of the employed gas, the extent of the compressor discharge pressure $P_2$, and the height between the compressor discharge and the turbine inlet ports.

The shaded area "E" represents the compressor-consumed and stored energy in form of the gas' elevated pressure, the lower line of which represents that portion of the total turbine-produced power necessary in the compression of the gas within the conduit upper portion. The system's frictional losses and other inherent limitations are overcome by that portion of the total turbine-produced power represented by "D", and the remainder is the system's wanted net generated power output.

The gas compression from initial to compressor discharge pressure causes a considerable rise in gas temperature. To further increase the density of the compressed gas within the conduit upper portion and thereby increase the system's efficiency, it is necessary to make the following modifications on the simplified system in FIG. 2 to arrive at the preferred embodiment in FIG. 1:

One is the implementation for the removal of the compressor-produced heat from the compressed gas within the additional aftercooler heat exchanger 10 located just downstream of the compressor 4 within the upper end of the conduit 1; the second is the implementation for the recuperation of the aftercooler removed compression heat within the additional compression heat recuperating heat exchanger 15 located between the system's primary high-pressure gas turbine 7 and the additional independently operating secondary low-pressure gas turbine 25 located just downstream of the heat exchanger 15 within the system's lower end.

Upon its compression from the initial compressor inlet pressure $P_1$ to the compressor discharge pressure $P_2$, the compression-heated gas traverses from the compressor discharge across the hot-gas inlet 11 entering the aftercooler heat exchanger 10, where it is cooled from the compressor discharge temperature $T_2$, to approach the temperature of the cooled heat-transfer fluid being pumped by fluid pump 22, via piping 21 and 23, from the lower heat exchanger 15 upward, to enter the upper heat exchanger 10 at the cooled fluid inlet 13.

Meanwhile, the cooled heat-transfer fluid circulating in a counter flow relative to the heated gas through the heat exchanger 10 is heated to approach the temperature of the compression-heated gas and is piped, via the heated fluid outlet 14 and the piping 20, from the upper heat exchanger 10 downward to enter the lower heat exchanger 15 at the heated fluid inlet 18 within the system's lower portion.

Upon cooling, the compression-heated gas leaves the after cooler heat exchanger 10 at the compressor discharge pressure $P_2$, and at the substantially lower temperature $T_3$, accompanied by its resulting rise to the highest density while within the system's upper portion.

The steady flow compression of the gas by the compressor 4 within the system's upper portion, together with the gas flow restriction through the plating of the primary turbine 7 and the secondary turbine 25 within the system's lower portion, produces and continuously maintains the elevated pressure of the steady downward-flowing mass of compressed and cooled gas within conduit 1.

Gravitational downward attractive force which is acting on the vertically confined, steady downward-flowing mass of compressed and cooled gas at highly increased density produces and continuously maintains a substantial increase in the gas' weight, which, in turn, manifests itself in addition to the compressor 4 produced discharge pressure $P_2$, as a non-power-consuming by gravity produced, from the compressor discharge pressure $P_2$ to the substantially higher turbine inlet pressure $P_3$ within the conduit 1, downwardly increasing gas pressure rise $P_3-P_2$, accompanied by the gas' resulting rise from the after cooler exit temperature $T_3$ to the substantially higher primary turbine inlet temperature $T_4$.

The compressed gas, at its highest pressure $P_3$ while within the conduit lower portion, then enters the primary turbine 7 at the temperature $T_4$, where it is cooled by extracting work from it while expanding to the substantially lower intermediate pressure $P_4$ at the corresponding lower temperature $T_5$.

The expansion-cooled gas then traverses from the primary turbine 7 across the cooled gas inlet 16, entering the compression heat recuperating heat exchanger 15, where it is reheated from the primary turbine exit temperature $T_5$ to approach the temperature of the heated heat-transfer fluid entering the heat exchanger 15 at the heated fluid inlet 18. Upon reheating, the primary turbine expanded gas leaves heat exchanger 15 at the heated gas outlet 17 at the intermediate pressure $P_4$ and at the substantially higher temperature $T_6$, thus expanding at constant pressure into the secondary turbine 25 where it is further cooled by extracting work from it, while expanding to the final pressure $P_5$ at the corresponding final temperature $T_7$.

Meanwhile, the heated heat-transfer fluid which is circulating in a counter flow relative to the cooled gas through the heat exchanger 15 is cooled to approach the temperature $T_5$ of the primary turbine expansion-cooled gas and is pumped by the fluid pump 22, via the piping 21 and 23, from the lower heat exchanger 15 upward to the upper heat exchanger 10, where the cooled heat-transfer fluid is utilized in the cooling of the compression-heated gas.

The foregoing detailed description is to be clearly understood as given by way of illustration and example only, the spirit and scope of this invention being limited solely by the appended claims.

What is claimed is:

1. A device for producing power by utilizing the gravity-induced compressional forces in a conduit of enormous height comprising:
   (A) first and second vertical conduits of substantial height, said conduits being connected at their upper and lower ends to define a closed fluid system, said height being of such a magnitude as to cause a gas in said first conduit to experience a gravity-induced compression;
   (B) a compressible gas circulating in said closed system;
   (C) means in said first conduit at an upper elevation for compressing said gas;
   (D) means downstream of said compressor, but also at an upper elevation, for cooling said gas;
   (E) means in said first conduit at a lower elevation for expanding the thus compressed and cooled gas to generate a work output.

2. A device as set forth in claim 1 wherein the means for expanding the gas is a turbine which drives an electric generator, and said generator is used in part to furnish electricity to power said means for compressing.

3. A device as set forth in claim 1 wherein the means for expanding the gas is a multistage turbine with reheating means between stages.

4. A device as set forth in claim 3 wherein the multistage turbine generates electricity, and part of said electricity is used to power said means for compressing.

5. A device as set forth in claim 3 wherein a closed heat exchange loop is used to provide both the means for cooling the gas at the upper elevation and the reheating of the gas between turbine stages at the lower elevation.

6. A device for producing power by utilizing the gravity effect on a column of gas comprising:
   (A) a first vertical conduit of enormous height, said height being of sufficient magnitude so as to create a gravity induced compression of a gas when said conduit is filled with such gas;
   (B) an externally powered means for compressing said gas at an upper elevation of said first conduit;
   (C) a gas expansion means for generating power at a lower elevation of said first conduit;

(D) at least one further conduit means connecting the bottom of the first conduit with the top of the first conduit, wherein a closed fluid circulating system is defined;

whereby gas circulates in the closed system serially through the means for compressing, and thence to the gas expansion means, and thence back to the means for compressing, to form a closed-cycle power loop.

7. A method of generating power comprising:
   (A) confining a volume of gas within a vertical conduit of enormous height, said height being of sufficient magnitude to cause a compression of the gas due to gravity induced forces;
   (B) compressing said gas at an upper elevation of said vertical conduit to induce a downward flow of the gas;
   (C) expanding said gas at a lower elevation of said conduit to produce work;
   (D) recirculating the resulting exhaust from the expansion step (C) back to the compressing step (B); Whereby the gas circulates in a closed system to produce a net work output.

8. The method as set forth in claim 7 wherein the work input for providing the compressing step (B) is taken from part of the work produced by the expansion step (C).

9. The method as set forth in claim 7 wherein the step of expanding is done by a multistage turbine with reheating between stages.

10. The method of claim 7 wherein the gas is cooled downstream of the compressing step at the upper elevation.

11. The method of claim 7 wherein the gas is cooled downstream of the compressing step at the upper elevation and the expansion step is performed by a multistage turbine with a reheater between stages.

12. The method of claim 11 wherein the cooling of the gas and the reheating between stages is accomplished by utilizing a single, closed heat exchange loop.

13. A device for producing power by utilizing the gravitational effect on a vertical column of gas comprising:
    (A) a first and a second conduit of substantial height being connected on their upper and lower ends to define a closed fluid circuit;
    (B) a heat exchange means being located within said first conduit upper end;
    (C) a expansion means for generating power being located within said first conduit lower end;
    (D) a heat exchange means being located downstream of said expansion means;
    (E) a closed heat exchange loop used to provide both the means for cooling the gas at said first conduit upper end and the reheating of the gas at said first conduit lower end;

wherein the increase in gas density generated by cooling of the gas within said first conduit upper end causes the column weight of the gas within said first conduit to overbalance the column weight of the gas within said second conduit.

* * * * *